US008706669B2

(12) United States Patent
Anouar et al.

(10) Patent No.: US 8,706,669 B2
(45) Date of Patent: Apr. 22, 2014

(54) CLASSIFICATION USING SUPPORT VECTOR MACHINES AND VARIABLES SELECTION

(75) Inventors: Fatiha Anouar, Glenmoore, PA (US); Gaston Baudat, Glenmore, PA (US)

(73) Assignee: MEI, Inc., Malvern, PA (US)

( * ) Notice: Subject to any disclaimer, the term of this patent is extended or adjusted under 35 U.S.C. 154(b) by 1227 days.

(21) Appl. No.: 12/375,158

(22) PCT Filed: Jul. 28, 2006

(86) PCT No.: PCT/IB2006/002398
§ 371 (c)(1),
(2), (4) Date: May 12, 2009

(87) PCT Pub. No.: WO2008/015489
PCT Pub. Date: Feb. 7, 2008

(65) Prior Publication Data
US 2009/0307167 A1    Dec. 10, 2009

(51) Int. Cl.
*G06N 5/00* (2006.01)

(52) U.S. Cl.
USPC .............................. 706/46; 194/207; 382/135

(58) Field of Classification Search
USPC .......................................................... 706/46
See application file for complete search history.

(56) References Cited

U.S. PATENT DOCUMENTS

| 5,503,262 | A | 4/1996 | Baudat et al. |
|---|---|---|---|
| 5,522,491 | A | 6/1996 | Baudat et al. |
| 6,588,571 | B1 | 7/2003 | Baudat |
| 6,662,170 | B1 * | 12/2003 | Dom et al. ...................... 706/45 |
| 7,232,024 | B2 * | 6/2007 | Mazur et al. .................. 194/207 |
| 2006/0098859 | A1 | 5/2006 | Anouar et al. |
| 2006/0254876 | A1 | 11/2006 | Baudat |
| 2007/0140551 | A1 * | 6/2007 | He et al. ........................ 382/159 |
| 2007/0278065 | A1 | 12/2007 | Voser |
| 2008/0281764 | A1 * | 11/2008 | Baxter ............................. 706/12 |

FOREIGN PATENT DOCUMENTS

| EP | 1 217 589 | 6/2002 |
|---|---|---|
| WO | WO-9800813 A2 | 1/1998 |
| WO | 04/001683 | 12/2003 |

OTHER PUBLICATIONS

G. Baudat et al., "Feature selection and projection using kernels," Neurocomputing, vol. 55, XP002423405, pp. 21-38 (Jun. 27, 2003).
T. Jebara, "Machine learning: discriminative and generative," Kluwer Academic Publishers, XP002423406, pp. 99-130 (2004).
S. Hochreitter et al., "Classification, regression and feature selection on matrix data," Technischer Bericht, XP002423407, pp. 1-59 (2004).
G. Baudat et al., "Feature vector selection and projection using kernels," Neurocomputing, vol. 55, XP002423405, pp. 21-38 (Jun. 27, 2003).
S. Theodoridis and K. Koutroumbas, "Pattern Recognition," Academic Press, pp. 155-159 (1999).
G. Fung and O. Mangasarian, "Data Selection for Support Vector Machine Classifiers," Proceedings of the Sixth ACM SIGKDD International Conference on Knowledge Discovery and Data Mining, pp. 64-70 (2000).

* cited by examiner

*Primary Examiner* — Jeffrey A Gaffin
*Assistant Examiner* — Kalpana Bharadwaj
(74) *Attorney, Agent, or Firm* — Mintz Levin Cohn Ferris Glovsky and Popeo, P.C.

(57) ABSTRACT

A method of deriving a classifier for classifying items using a plurality of variables for characteristics of the items, the method comprising determining a representative subset of the variables for use in said classifier.

29 Claims, 3 Drawing Sheets

CLASSIFICATION USING SUPPORT VECTOR MACHINES AND VARIABLES SELECTION

CROSS REFERENCE TO RELATED APPLICATIONS

This application is a national phase filing under 35 U.S.C. §371 of International application number PCT/IB2006/002398, filed Jul. 28, 2006.

The invention relates to improvements in classification. The invention is especially applicable to classification of items of currency or value, such as banknotes or coins.

The invention is related to our co-pending applications, EP 1 217 589 A and EP 1 516 293 A, the contents of which are incorporated herein by reference.

In the following, SVM stands for Support vector machine, FVS stands for Feature Vector Selection (see EP 1 516 293 A mentioned above) and the term billway stands for the feeding of a bill in a validator in one orientation. Thus, there are 4 billways per denominations.

In a bill acceptor comprising transport means, sensor means, memory and processing means, scanning the document with many sensors and many wavelengths results in a large volume of multivariate data stored in a memory that can be used to discriminate and authenticate the documents, and to denominate a bill in the case of a banknote acceptor. It is desirable for this process to be fast and it is known that a subset of the data can be sufficient to achieve a better result. This application relates to finding an optimal subset of variables representing the data.

Aspects of the invention are set out in the accompanying claims.

This new denomination algorithm deals with the selection of the input data that are given to a SVM (Support Vector Machine) algorithm.

The purpose of the variable selection is to eliminate irrelevant or less relevant variables for classification purposes and at the same time to keep a high separation performance. The idea is to find a set of variables that are highly correlated with the projected data on the separation vector obtained with the SVM when trained with all variables.

The process can be used to generate data inputs for the bill validator to use in order to denominate bills from a pre-defined bill set comprising classes. The classes can be the 4 bill ways of a single denomination and/or other denominations. The selected variables and discriminant axis generated by the process may be loaded in the memory of the validator. They are used by the validator to later validate a new sample presented to the unit as being a member of one of the classes.

Although the embodiments of the invention are described in the context of denominating bills, the process can be broadly applied to any problem of variable selection, including for example the authentication problem in the context of bill validation.

Embodiments of the invention will be described with reference to the accompanying drawings of which:

Figure 1:
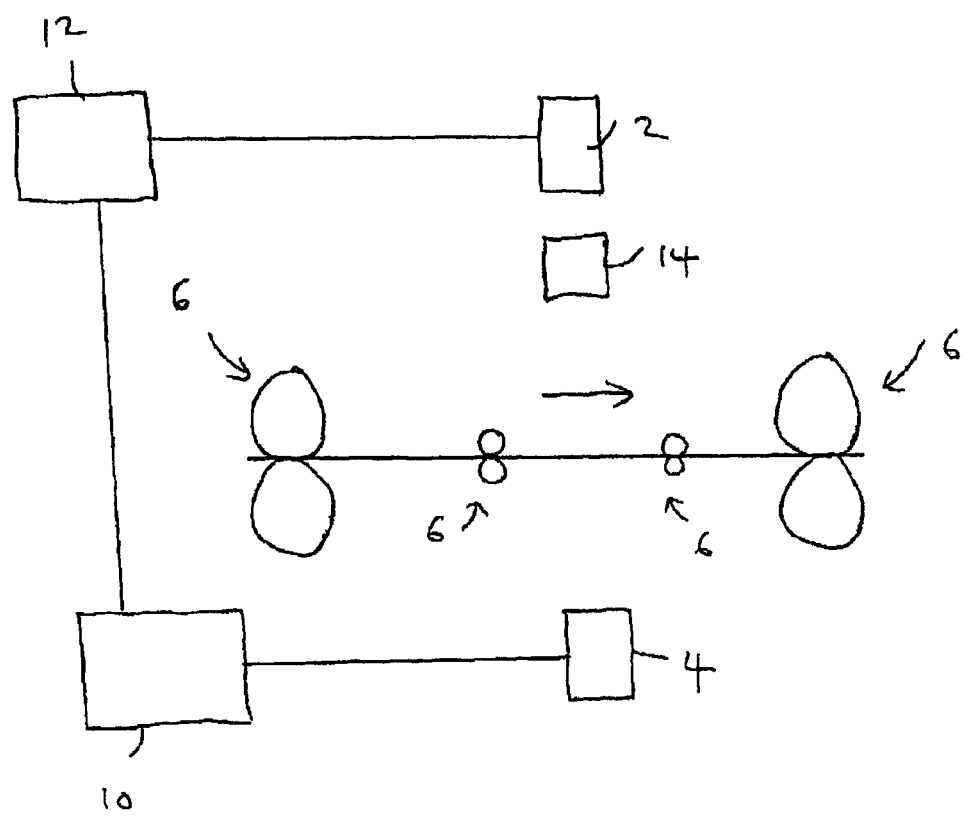
FIG. 1 is a schematic diagram of a banknote sensing system.

A banknote sensing system according to an embodiment of the invention is shown schematically in FIG. 1. The system includes a light source array 2 arranged on one side of a banknote transport path, and a light sensor array 4 arranged on the other side of the banknote transport path, opposite the light source array 2. The system includes banknote transport means in the form of four sets of rollers 6 for transporting a banknote 8 along the transport path between the light source array 2 and the light sensor array 4. The light source array 4 is connected to a processor 10 and the system is controlled by a controller 12. A diffuser 14 for diffusing and mixing light emitted from the light source array 2 is arranged between the light source array 2 and the banknote transport path.

Figures 2, 3:
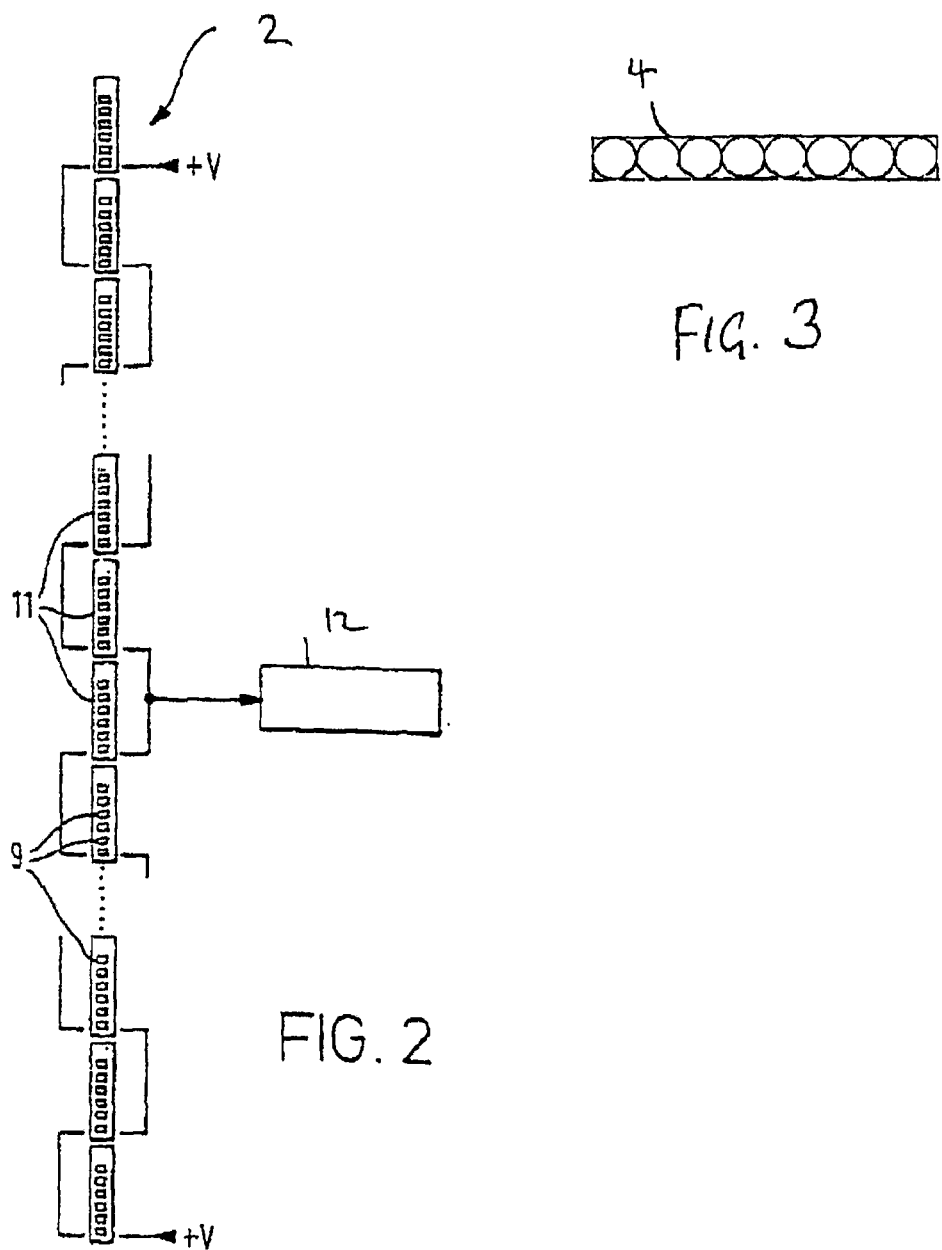
FIG. 2 is a plan view from above of the sensor array of the sensing system of FIG. 1.
FIG. 3 is a plan view from below of the light source array of the sensing system of FIG. 1.

FIG. 2 is a plan view from below of the light source array 2. As shown, the light source array is a linear array of a plurality of light sources 9. The array is arranged in groups 11 of six sources, and each source in a group emits light of a different wavelength, which are chosen as suitable for the application, usually varieties of blue and red. A plurality of such groups 11 are arranged linearly across the transport path, so that light sources for each wavelength are arranged across the transport path.

FIG. 3 is a plan view from above of the light sensor array 4. As shown, the light sensor array includes eight circular light sensors arranged in a line across the transport path. The sensors are 7 mm in diameter and the centres are spaced 7 mm apart in a line, so that the sensors are side by side.

FIGS. 2 and 3 are not to scale, and the light source and light sensor arrays are approximately the same size.

In operation, a banknote is transported by the rollers 6, under control of the controller 12, along the transport path between the source and sensor arrays 2, 4. The banknote is transported by a predetermined distance then stopped. All the light sources of one wavelength are operated and, after mixing of the light in the diffuser 14 to spread it uniformly over the width of the banknote, the light impinges on the banknote. Light transmitted through the banknote is sensed by the sensor array 4, and signals are derived from the sensors for each measurement spot on the banknote corresponding to each sensor. Similarly, the light sources of all the other wavelengths are similarly operated in succession, with measurements being derived for the sensors for each wavelength, for the corresponding line.

Next, the rollers 6 are activated to move the banknote again by the predetermined distance and the sequence of illuminating the banknote and taking measurements for each wavelength for each sensor is repeated.

By repeating the above steps across the length of the banknote, line by line, measurements are derived for each of the six wavelengths for each sensor for each line of the banknote, determined by the predetermined distance by which the banknote is moved.

As mentioned above, the document is scanned by a linear sensor array that measures spots on the document with a pre-defined scanning resolution in width and length and for multiple wavelengths.

Because the documents can have different dimensions, a full scan can technically yield data sets of different sizes. A discrimination algorithm works by comparing objects using measurement vectors that have to be of a common size. As in practice the documents can have different size, if only for tolerance reasons, a scanning maximum area that is common to all sizes to denominate is defined. This common size will vary with the bill sets targeted.

By design an SVM classifier works with 2 classes. The discrimination and the variable selection is performed using 2 classes, the first class is the reference class and the second class contains all the bills other than class 1. In the case of denomination and for practical purpose, the documents used in class 2 are close to those of class 1 according to their dimension. It means that they pass the length and width test of class 1 (it is otherwise trivial to separate documents of different dimensions). Further details of SVM classifiers can be found in prior art literature.

Test samples for the reference class and second class are measured using a sensor array as described above, and the measured values are processed as described below, to generate a SVM with a reduced set of variables.

Let X be the set of data $X=x_{ij}$, $i=1\ldots M$, $j=1\ldots N$, where M is the number of bills and N is the number of variables. A variable is a given spot location and a given wavelength. In other words for each bill i all the variables (length×width×wavelength) in one vector $x_{ij}$, $j=1\ldots N$. For a given bill i the variable j is submitted to a normalisation by subtracting the mean of four tracks in the associated wavelength.

In more detail, the spots used for normalisation are defined by four tracks. The mean of the four tracks is computed for each wavelength and stored in a vector $\{m_1,m_2,m_3,m_4,m_5,m_6\}$, for example, for six wavelengths. Then each measurement $x_{ij}$ of the associated wavelength k is normalized by subtracting $m_k$.

For convenience, the whole set of data is normalized before applying the variable selection algorithm.

The normalisation above removes from each variable the global effect of the bill such as the paper or dust or aging. On the other hand, the scaling process deals with the dispersion of the whole set of bills. The set of data X is composed of two sets: data related to the reference class class1 and those related to class2: $X=(X^1,X^2)$. The two sets of data are scaled using the mean and the standard deviation of class 1. The scaling is given by:

$$X^1 = \frac{|X^1 - \text{mean}(X^1)|}{std(X^1)} \quad (3)$$

$$X^2 = \frac{|X^2 - \text{mean}(X^1)|}{std(X^1)}$$

Where: $\text{mean}(X^1) = \frac{1}{M^1}\sum_{i=1}^{M^1} x_{ij}$ and $$std(X^1) = \sqrt{\frac{1}{M^1-1}\sum_{i=1}^{M^1}(x_{ij} - \text{mean}(X^1))^2}$$

A linear SVM is trained with all variables X and the resulting discriminant axis W1 is given by:

$$W1 = SVs1^{t*}\text{Alpha1}$$

where SVs1 is a matrix (L, N) of L support vectors and Alpha1 is the vector of Lagrange multipliers of a size L. See Vapnik V., "The Nature of Statistical Learning Theory", Springer Verlag, 1995 for further details.

The data are projected onto W1. The goal is to find the variables that are together highly correlated with the projected data on the discriminant axis W1.

In this embodiment, the problem of finding the best S variables is solved by a forward sequential selection. The algorithm starts with an empty set of variables and adds variables until S variables have been selected. A fitness criterion is evaluated for the set of variables that combines the already selected and the current variable. The one giving the maximum fitness is added to the set of selected variables.

Note that the forward sequential selection is just one of many selection algorithm that could be used such as backward or stepwise selection. See, for example, Fukunaga K., "Introduction to Statistical Pattern Recognition", Academic Press, INC, $2^{nd}$ ed. 1990 for further details regarding selection algorithms.

Let us name the discriminant axis W1, the projected data $$P = \begin{pmatrix} P^1 \\ P^2 \end{pmatrix}$$

of class1 and class2, and the set of data with $S=\{s_1,\ldots,s_r\}$ selected variables $X_s$:

$$P=X*W1 \quad (4)$$

$$X_S=(x_{ij})i=1\ldots M, j=s_1\ldots s_r.$$

First of all the projection P and the set of data X are centered by subtracting their means:

$$P=P-\text{mean}(P) \quad (5)$$

$$X=X-\text{mean}(X) \quad (6)$$

Then the vector P is scaled $$P=P/\text{norm}(P) \quad (7)$$

Assuming that we have already selected $S=\{s_1,\ldots,s_r\}$ variables and we are evaluating the relevance of the variable j that is not taken yet ($j\notin S$). The fitness defines a kind of correlation between $S_j=S\cup\{j\}$ and P.

$$F_{S_j}=K_{S_jP}{}^t K_{S_jS_j}{}^{-1}K_{S_jP} \quad (8)$$

Where $K_{S_jP}=X_{S_j}{}^t P$ and $K_{S_jS_j}=X_{S_j}{}^t X_{S_j}$

The variable giving the best fitness is added to set of selected variables. We stop selecting variables when the fitness reaches a given value (0.998) or if we have selected a predefined number of variables.

The steps of the algorithm can be summarised as set out below:
1. Construct the whole set of normalised variables.
2. Then scale the data according to (3).
3. Train the SVM with the whole set of variables. SVM returns the support vectors that will be used to construct the discriminant vector W1.
4. Project all the data on to W1: P=X*W1,
5. Center the vector P according to (5);
6. Scale the vector P using its norm: P=P/norm(P);
7. Scale X according to (6);
8. initialisation of selection: $R=\{1\ldots N\}$, $S=\{\ \}$;
9. Repeat
   a) For all remaining variables in R; evaluate the fitness criterion $F_{S_j}$ (8) of the variable j. F is the list of all fitnesses: $F=(F_{S_j})j\in R$
   b) Find the best variable that maximizes the fitness: best=arg max$_j$(F)
   c) Add the variable best to the set of selected variables $S=S\cup\{\text{best}\}$;
   d) Remove the variable best from the remaining list of variables $R=\{1\ldots,\text{best}-1,\text{best}+1,\ldots N\}$;

Until the number of selected variables or the fitness reach a given value.

10. Retrain the SVM with the selected variables and retain the discriminant axis W2 given by $W2=SVs2^{t*}\text{Alpha2}$ as the final discriminator. SVs2 and Alpha2 are the support vectors and the Lagrange multipliers of the second run of SVM.

The above discussion relates to selecting the subset of variables to be used in the banknote tester. Parameters representing the selected variables and the discriminant axis are stored in the memory of the banknote tester and used for subsequent testing (authentification, denomination etc).

More specifically, to test a banknote, the banknote is sensed by the sensor array, and the measurements for the selected variables are processed by the SVM. The measurements are used to build a test vector, which is projected onto the discriminant vector W2. This results in a scalar value which can be compared with one or more thresholds. For example, if the scalar value is less than or greater than a give threshold it can be treated either as belonging to a reference class or not. Similarly, for two thresholds, if the scalar value is between two thresholds it can be treated as belong to a reference class or otherwise not.

The processing for deriving the subset of variables and discriminant axis can be performed either in the banknote tester itself, or in a separate device, with the parameters representing the selected variables and the discriminant axis being subsequently stored in the memory of a banknote tester for later use.

As discussed above, this approach gives a similar result in terms of performance to using the original number N variables, but actually using fewer variables, so that there is less processing and hence faster results.

It is also possible not to norm P and use another range for the fitness criteria. The higher the value of the fitness, the better is the reconstruction of the projected data. It is convenient to fix this value to a given level smaller than 1 to avoid numerical problems, for instance 0.998 and stop the selection when this value is reached.

Practical tests in a bill validator for various denomination have shown that about around 20 to 40 variables are sufficient for keeping a high performance when some other variants require more, for example like 64 variables.

Figure 4:
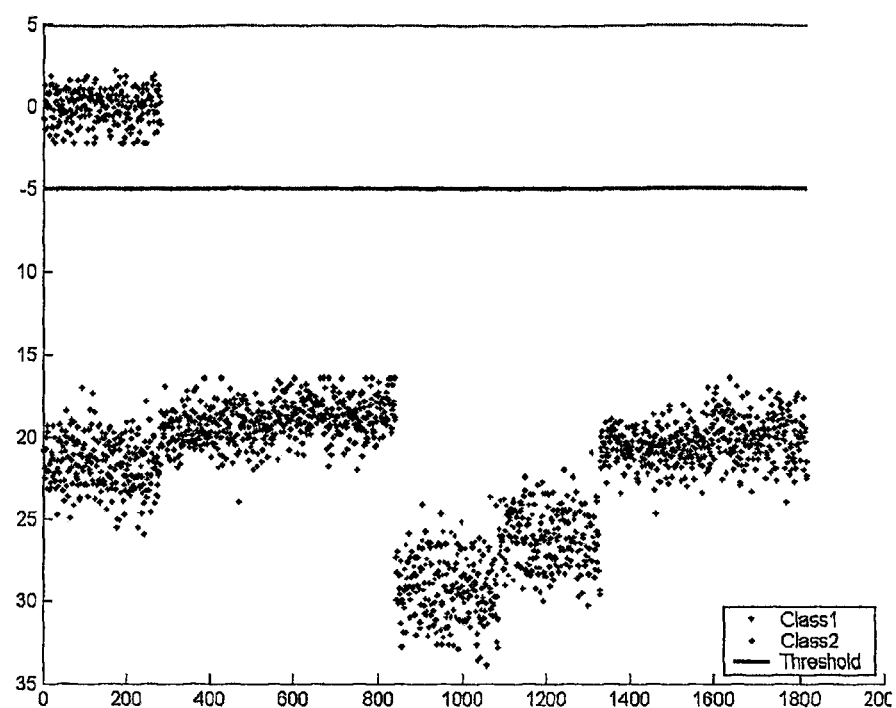
FIG. 4 is graph illustrating classification.

FIG. 4 shows the SVM results for the denomination of a 2 specific denominations with all variables, in this case 357 (top) and 16 variables (bottom).

It can be seen that in this case, all the objects of the $2^{nd}$ class are on one side of the reference class and the classes can be separated by a single threshold. Alternatively the reference class can be enclosed between 2 values defining an acceptance window to cover the possibility that a foreign object could be classified on the other side of the reference class.

In the embodiment, the subset of variables is selected using a SVM classifier, and then the selected subset of variables is used for classification using an other SVM classifier, However, once the relevant variables, which are representative of the original variables and corresponding input data, have been selected, any suitable type of classification can be carried out using the relevant variables, such as LDA (linear discriminant analysis) or Mahalanobis distance, or similar, as known to the person skilled in the art. The representative subset is chosen to reduce the number of variables whilst maintaining adequate performance in terms of classification, so that the selected variables are representative of the original variables and the corresponding data. This can be evaluated in various ways, such as using a fitness function as described above.

References to banknotes include other similar types of value sheets such as coupons, cheques, and includes genuine and fake examples of such documents. A system may involve the use of means, such as edge-detectors, for detecting the orientation, such as skew and offset of a banknote relative to, eg, the transport direction and/or the sensor array or a fixed point(s). Alternatively, a system may include means for positioning a banknote in a desired orientation, such as with the length of the bill along the transport path with edges parallel to the transport direction, or at a desired angle relative to the transport direction and/or sensor array.

The described embodiments are banknote testers. However, the invention may also be applied to other types of currency testers, such as coin testers. For example, signals from a coin tester taking measurements of coin characteristics, such as material, at a succession of points across a coin may be interpolated to produce a signal representative of the characteristic across the coin.

The term "coin" is employed to mean any coin (whether valid or counterfeit), token, slug, washer, or other metallic object or item, and especially any metallic object or item which could be utilised by an individual in an attempt to operate a coin-operated device or system. A "valid coin" is considered to be an authentic coin, token, or the like, and especially an authentic coin of a monetary system or systems in which or with which a coin-operated device or system is intended to operate and of a denomination which such coin-operated device or system is intended selectively to receive and to treat as an item of value.

The invention claimed is:

1. A method of deriving a classifier for classifying currency bills using a plurality of variables for characteristics of the bills, the method comprising:
   determining a representative subset of the plurality of variables for use in said classifier by using a first classifier and the plurality of variables to select the representative subset of the plurality of variables based on a fitness criteria describing a correlation of at least some of the plurality of variables with input data projected on a discriminant axis of the first classifier;
   wherein the bills are classified between a reference class which is one billway of a denomination and a second class containing at least 3 other billways of the same denomination.

2. The method of claim 1 wherein the first classifier is a support vector machine (SVM) classifier.

3. The method of claim 1 wherein the fitness criteria, $F_{S_j}$, is defined according to the equation $F_{S_j} = K_{S_j P}{}^t K_{S_j S_j}{}^{-1} K_{S_j P}$.

4. A method of deriving a classifier for classifying items using a first classifier and a plurality of variables for characteristics of the items, the method comprising:
   determining a first subset of the plurality of variables for use in said classifier;
   selecting a second subset of the plurality of variables, by incrementally increasing or decreasing said first subset of variables with a chosen variable that increases or decreases a fitness criteria, the fitness criteria describing a correlation of at least some of the plurality of variables with input data projected on a discriminant axis of the first classifier.

5. The method of claim 4 comprising evaluating each subset using a fitness criteria.

6. The method of claim 4 comprising increasing or decreasing said first subset of the plurality of variables until a predetermined number of variables and/or a predetermined fitness criterion level is reached.

7. The method of claim 1 comprising scaling input data.

8. The method of claim 7 wherein scaling is based on a subset of input data.

9. The method of claim 8 wherein the scaling is based on input data for the reference class.

10. The method of claim 9 wherein the scaling of input data is based on a mean and a standard deviation of the input data.

11. The method of claim 9 wherein scaling the input data involves subtracting a mean of the input data from the input data and dividing by a standard deviation of the input data.

12. The method of claim 7 comprising taking an absolute value of the scaled data.

13. A method of deriving a classifier for classifying items using a plurality of variables for characteristics of the items, the method comprising:
   determining a representative subset of the variables for use in said classifier;
   constructing a whole set of normalized variables,
   scaling input data according to an equation $$X = \frac{|X - \text{mean}(x)|}{std(X)},$$

training support vector machine (SVM)classifier with substantially the whole set of variables,
   constructing a discriminant vector W1,
   projecting substantially all the input data onto W1 such that P=X*W1,
   centering the vector P according to an equation p=p−mean (p),
   scaling the vector P using its norm such that P =P/norm(P),
   scaling x according to an equation x=x−mean(x),
   initializing a selection R={1...N},S={ },
   repeating a sequence until a number of selected variables or a fitness criterion reach a given value, the sequence comprising:
      for all remaining variables in R, evaluate the fitness criterion $F_{S_j} = K_{S_jP}^t K_{S_jS_j}^{-1} K_{S_jP}$ of the variable j, wherein F is the list of all fitnesses, and is defined according to an equation $F=(F_{S_j})j \in R$,
      find a best variable that maximizes the fitness according to an equation best=arg max$_j$(F),
      add the variable best to the set S of selected variables according to an equation S=S ∪{best}
      remove the variable best from the list of remaining variables R={1...best−1,best+1...N};
   upon completion of the sequence, retraining the SVM with the selected variables and retaining a discriminant axis W2=SVs2$^t$ * Alpha2 as a final discriminator, wherein SVs2 and Alpha2 are support vectors and Lagrange multipliers of a second run of SVM.

14. The method of claim 1 wherein the second class further comprises a plurality of other denominations.

15. The method of claim 4 for classifying coins between a reference class which is a coin of a first denomination and a second class which is at least one coin of another denomination.

16. A method of testing an item of currency using the classifier derived using the method of claim 4.

17. The method of claim 4 wherein the items are different from the data set used to derive the classifier.

18. The method of claim 17 comprising measuring a currency item, extracting data for the selected variables, and using the data for the selected variables and the classifier to derive a scalar value.

19. The method of claim 18 comprising projecting the data for the selected variables onto a derived classifier discriminant axis to derive the scalar value.

20. The method of claim 18 comprising comparing the scalar value with a threshold.

21. The method of claim 20 comprising accepting or rejecting a currency item depending on whether the scalar is above or below the threshold.

22. The method of claim 18 comprising comparing the scalar value with two thresholds.

23. The method of claim 22 comprising accepting a currency item if the scalar is between the two thresholds and rejecting it otherwise.

24. A method of manufacturing a currency validator comprising storing a representation of the classifier derived using the method of claim 1 in the validator.

25. The method of claim 24 comprising storing a representation of a classification function and the subset of variables.

26. The method of claim 24 comprising storing one or more of factors representing support vectors and the discriminant axis and the subset of variables.

27. A currency validator comprising:
   at least one sensor;
   at least one data processor; and
   memory storing a representation of a support vector machine (SVM classifier derived using a method of deriving a classifier for classifying currency bills using a plurality of variables for characteristics of the bills, the method comprising:
      determining a representative subset of the plurality of variables for use in said classifier by using a first classifier and the plurality of variables to select the representative subset of the plurality of variables based on a fitness criteria describing a correlation of at least some of the plurality of variables with input data projected on a discriminant axis of the first classifier;
      wherein the bills are classified between a reference class which is one billway of a denomination and a second class containing at least 3 other billways of the same denomination.

28. An apparatus comprising:
   at least one data processor; and
   memory storing instructions which, when executed by the at least one data processor, causes the at least one data processor to perform operations for deriving a classifier for classifying currency bills using a plurality of variables for characteristics of the bills, the operations comprising:
      determining a representative subset of the plurality of variables for use in said classifier by using a first classifier and the plurality of variables to select the representative subset of the plurality of variables based on a fitness criteria describing a correlation of at least some of the plurality of variables with input data projected on a discriminant axis of the first classifier;
      wherein the bills are classified between a reference class which is one billway of a denomination and a second class containing at least 3 other billways of the same denomination.

29. The method of claim 4, wherein said chosen variable is not in the first subset of the plurality of variables when the first subset of the plurality of variables is increased and said chosen variable is in the first subset of the plurality of variables when the first subset of the plurality of variables is decreased.

* * * * *